(12) United States Patent
Harral (10) Patent No.: US 10,788,398 B2
(45) Date of Patent: Sep. 29, 2020

(54) GAS TURBINE ENGINE TEST STAND

(71) Applicant: Rolls-Royce Corporation, Indianapolis, IN (US)

(72) Inventor: Jacob W. Harral, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 838 days.

(21) Appl. No.: 15/389,554

(22) Filed: Dec. 23, 2016

(65) Prior Publication Data

US 2018/0179913 A1 Jun. 28, 2018

(51) Int. Cl.
*G01M 15/14* (2006.01)
*F01D 21/00* (2006.01)
*F01D 25/28* (2006.01)

(52) U.S. Cl.
CPC ........... *G01M 15/14* (2013.01); *F01D 21/003* (2013.01); *F01D 25/285* (2013.01); *F05D 2260/83* (2013.01)

(58) Field of Classification Search
CPC .... F01D 21/003; F01D 25/285; G01M 15/14; F05D 2260/80; F05D 2260/83
USPC ......................................... 73/112.01–112.05
See application file for complete search history.

(56) References Cited

U.S. PATENT DOCUMENTS

| | | | |
|---|---|---|---|
| 2,925,290 A | 2/1960 | Greenwald | |
| 5,143,384 A | 10/1992 | Lipschitz | |
| 6,155,572 A | 12/2000 | Wu | |
| 6,244,599 B1 | 1/2001 | Braun | |
| 7,574,904 B1* | 8/2009 | Davies | G01M 99/002 73/112.01 |
| 8,191,410 B2* | 6/2012 | Hansen | G01M 15/14 73/112.05 |
| 8,215,645 B1 | 7/2012 | Aho | |
| 8,522,606 B2* | 9/2013 | Iannuzzi | F02C 3/22 73/112.05 |
| 8,584,514 B2* | 11/2013 | Tecza | F01D 21/003 73/112.01 |
| 8,789,866 B2* | 7/2014 | Spanos | F01D 25/285 294/67.5 |
| 9,528,912 B2* | 12/2016 | Buquet | F02C 7/00 |
| 9,632,011 B2* | 4/2017 | Fuller | G01M 15/14 |
| 10,018,274 B2* | 7/2018 | Khaira | F16J 15/3492 |
| 10,132,412 B2* | 11/2018 | Matheidas | F16J 15/43 |
| 2008/0011071 A1* | 1/2008 | Figura | F01D 25/00 73/118.01 |
| 2008/0095609 A1* | 4/2008 | Block | F02C 9/28 415/30 |
| 2008/0236261 A1* | 10/2008 | Ono | F01D 25/285 73/112.01 |
| 2010/0089136 A1* | 4/2010 | Luneburg | G01H 1/006 73/112.01 |
| 2011/0048119 A1* | 3/2011 | Hansen | G01M 15/14 73/118.01 |

(Continued)

FOREIGN PATENT DOCUMENTS

WO 1999031414 A1 6/1999

*Primary Examiner* — Alain Chau
(74) *Attorney, Agent, or Firm* — Barnes & Thornburg LLP (57) ABSTRACT

A gas turbine engine test assembly includes a test apparatus having a rotor and stator and a bearing assembly having a fluid circuit providing an adjustable fluid pressure interface between the rotor and stator.

17 Claims, 6 Drawing Sheets

(56) References Cited

U.S. PATENT DOCUMENTS

| | | | |
|---|---|---|---|
| 2012/0160021 A1* | 6/2012 | Iannuzzi | F02C 3/22 |
| | | | 73/112.05 |
| 2012/0192631 A1* | 8/2012 | Tecza | F01D 21/003 |
| | | | 73/112.01 |
| 2013/0028699 A1* | 1/2013 | Spanos | F01D 25/285 |
| | | | 414/800 |
| 2014/0050565 A1* | 2/2014 | Schlosser | F16D 33/18 |
| | | | 415/118 |
| 2015/0177104 A1* | 6/2015 | Buquet | F02C 7/00 |
| | | | 73/112.01 |
| 2015/0177106 A1* | 6/2015 | Fuller | G01M 15/14 |
| | | | 73/112.01 |
| 2016/0290280 A1* | 10/2016 | Blankenship | F02G 5/02 |
| 2017/0343448 A1* | 11/2017 | Huppe | G01M 3/3281 |

* cited by examiner

GAS TURBINE ENGINE TEST STAND

BACKGROUND

The present disclosure relates generally to gas turbine engines, and more specifically to gas turbine engines for generating rotational force.

Gas turbine engines are used to power aircraft, watercraft, electrical generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

Gas turbine engines often undergo operational testing. Such testing can assist in tuning, troubleshooting, and/or assembling the engine, among other uses.

SUMMARY

The present disclosure may comprise one or more of the following features and combinations thereof.

According to an aspect of the present disclosure, a gas turbine engine test assembly may include a gas turbine engine including a spool assembly for generating rotational force, the spool assembly having a compressor section for compressing air, a combustor section for combusting a mixture of fuel and compressed air, a turbine section for expanding products of combustion from the combustor, and an output drive shaft coupled with the turbine section to transfer rotational force, a test apparatus coupled with the drive shaft to receive rotational force from the gas turbine engine, the test apparatus including a test device, a test shaft rotationally coupled to the drive shaft for rotation about an axis, and a positioner bearing assembly connected with the test device for supporting the test shaft. The positioner bearing assembly may include a rotor coupled with the test shaft, at least one stator fixed with the test device adjacent to the rotor, and at least one fluid seal arranged between the rotor and the at least one stator and defining a clearance therebetween. The positioner bearing assembly may include a fluid circuit including a fluid chamber defined between the rotor and the at least one stator to provide a fluid interface therebetween, a fluid inlet for receiving fluid into the fluid chamber, and a fluid outlet for expelling fluid from the fluid chamber. At least one of the rotor and the at least one stator may be movable relative to the other between a relief position in which the clearance has an enlarged arrangement and a pressure position in which the clearance has a reduced arrangement to regulate a pressure within the fluid chamber.

In some embodiments, the fluid outlet may include the clearance and a cross-sectional flow area defined by the clearance may be inversely proportionate to the pressure within the fluid chamber such that when the area is reduced the pressure increases.

In some embodiments, the at least one stator may include two stators each arranged on opposite sides of the rotor. The at least one fluid seal may include two fluid seals each arranged between the rotor and one of the two stators.

In some embodiments, each fluid outlet of each of the two stators may include the respective clearance defined between the rotor and the respective stator, the respective clearance determined by a relative position of the rotor and the respective stator. Each of the clearances may have a cross-sectional flow area that is inversely proportionate to the pressure within the corresponding fluid chamber such that when the cross-section flow area is reduced the corresponding pressure increases.

In some embodiments, the fluid chamber may be formed as a depression defined in at least one of the fluid seal and the rotor.

In some embodiments, the fluid chamber may be formed as a depression defined in the fluid seal and the rotor may include a radial flange defining a boundary of the fluid chamber.

In some embodiments, the fluid outlet may form a valve means for regulating the rate of fluid therethrough to govern the pressure within the fluid chamber.

In some embodiments, a cross-sectional flow area of the clearance may be greater in the enlarged arrangement than in the reduced arrangement.

According to another aspect of the present disclosure, a test apparatus for a gas turbine engine may include a test device, a test shaft arranged for coupling to a drive shaft of a gas turbine engine and supported for rotation about an axis to the test device to apply a torque, and a positioner bearing assembly connected with the test device for supporting the test shaft. The positioner bearing assembly may include a rotor coupled with the test shaft, a stator fixed with the test device adjacent to the rotor, and a fluid seal arranged between the rotor and the stator and defining a clearance therebetween. The positioner bearing assembly may include a fluid circuit including a fluid chamber defined between the rotor and the stator to provide a fluid interface therebetween, a fluid inlet for receiving fluid into the fluid chamber, and a fluid outlet for expelling fluid from the fluid chamber. At least one of the rotor and the stator may be movable relative to the other between a relief position defining the clearance to have an enlarged arrangement and a pressurized position defining the clearance to have a reduced arrangement to regulate a pressure within the fluid chamber.

In some embodiments, the fluid outlet may include the clearance, and the positioner bearing assembly may be configured for movement of the at least one of the rotor and the stator relative to the other to reduce a cross-sectional flow area of the clearance to increase the pressure within the fluid chamber such that the cross-sectional flow area defined by the clearance is inversely proportionate to the pressure within the fluid chamber.

In some embodiments, the test apparatus may include another stator arranged on an opposite side of the rotor from the stator, another fluid bearing arranged between the rotor and the another stator and defining another clearance, another fluid seal arranged between the rotor and the another stator, and another fluid circuit having another fluid chamber defined between the rotor and the another stator to provide a fluid interface therebetween, a fluid inlet for receiving fluid into the another fluid chamber, and a fluid outlet for expelling fluid from the another fluid chamber.

In some embodiments, each fluid outlet of each of the two stators may include the respective clearance defined between the rotor and the respective stator, and a cross-sectional flow area of each clearance may be defined according to the relative position of the rotor and the respective stator such that the cross-sectional flow area of each clearance is inversely proportionate to the pressure within the corresponding fluid chamber.

In some embodiments, the fluid chamber may be formed as a depression defined circumferentially about the axis in at least one of the fluid seal and the rotor. In some embodiments, the fluid chamber may be formed as a depression defined in the fluid seal and the rotor includes a radial flange defining a boundary of the fluid chamber.

In some embodiments, the fluid outlet may form a valve means for regulating the rate of fluid therethrough to govern the pressure within the fluid chamber.

In some embodiments, a cross-sectional flow area of the clearance may be greater in the enlarged arrangement than in the reduced arrangement.

In some embodiments, the fluid outlet may include an outer lip extending radially from the seal disk towards the rotor to define a portion of the fluid chamber and to define the clearance.

According to another aspect of the present disclosure, a method of operating a test apparatus may include driving the test shaft for rotation, providing pressurized fluid to the fluid chamber, passing the pressurized fluid through the clearance, and adjusting a cross-sectional flow area of the clearance to regulate pressurized fluid through the outlet. The test apparatus may include a testing device, a test shaft couplable to a drive shaft of the gas turbine engine and supported for rotation about an axis to apply a torque to the test device, and a positioner bearing assembly for supporting the test shaft. The positioner bearing assembly may include a rotor coupled with the test shaft, a stator fixed with the test device adjacent to the rotor, a fluid seal arranged between the rotor and the stator and defining a clearance therebetween, and a fluid circuit including a fluid chamber defined between the rotor and the stator to provide a fluid interface therebetween, a fluid inlet for receiving fluid into the fluid chamber, and a fluid outlet for expelling fluid from the fluid chamber, wherein at least one of the rotor and the stator is movable relative to the other between a relief position defining the clearance to have an enlarged arrangement and a pressurized position defining the clearance to have a reduced arrangement to regulate a pressure within the fluid chamber.

In some embodiments, adjusting a cross-sectional flow area of the clearance to regulate pressurized fluid through the outlet may include adjusting a cross-sectional flow area of the clearance based on the pressure within the fluid chamber.

According to another aspect of the present disclosure, a positioner bearing assembly may include a rotor coupled with a shaft for driven rotation, a stator fixed relative to the rotor and positioned adjacent to the rotor, and a fluid seal arranged between the rotor and the stator and defining a clearance therebetween. The positioner bearing assembly may include a fluid circuit including a fluid chamber defined between the rotor and the stator to provide a fluid interface therebetween, a fluid inlet for receiving fluid into the fluid chamber, and a fluid outlet for expelling fluid from the fluid chamber. At least one of the rotor and the stator may be movable relative to the other between a relief position defining the clearance to have an enlarged arrangement and a pressurized position defining the clearance to have a reduced arrangement to regulate a pressure within the fluid chamber.

In some embodiments, the fluid outlet may include the clearance and a cross-sectional flow area defined by the clearance may be inversely proportionate to the pressure within the fluid chamber such that when the cross-sectional flow area is reduced the pressure increases.

In some embodiments, the at least one stator may include two stators each arranged on opposite sides of the rotor. The at least one fluid seal may include two fluid seals each arranged between the rotor and one of the two stators.

In some embodiments, each fluid outlet of each of the two stators may include the respective clearance defined between the rotor and the respective stator that is determined by a relative position of the rotor and the respective stator, and each of the clearances may have a cross-sectional flow area that is inversely proportionate to the pressure within the corresponding fluid chamber such that when the cross-sectional flow area is reduced the corresponding pressure increases.

In some embodiments, the fluid chamber may be formed as a depression defined in at least one of the fluid seal and the rotor. In some embodiments, the fluid chamber may be formed as a depression defined in the fluid seal and the rotor includes a radial flange defining a boundary of the fluid chamber.

In some embodiments, the fluid outlet may form a valve means for regulating the rate of fluid therethrough to govern the pressure within the fluid chamber.

In some embodiments, a cross-sectional flow area of the clearance may be greater in the enlarged arrangement than in the reduced arrangement.

In some embodiments, the fluid outlet may include an outer lip extending radially from the seal disk towards the rotor to define a portion of the fluid chamber and to define the clearance.

These and other features of the present disclosure will become more apparent from the following description of the illustrative embodiments.

BRIEF DESCRIPTION OF THE DRAWINGS

FIG. 6 is the cross-sectional view of FIG. 5 showing the rotor shifted to the left to show the other outlet (left hand)

in a reduced arrangement to increase pressure within the corresponding fluid chamber, and the one outlet (right hand) in a widened arrangement to relieve pressure within the corresponding fluid chamber to encourage the test shaft back towards a default position (to the right);

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Gas turbine engines may be adapted for various uses, such as to propel aircraft, watercraft, and/or for power generation. Gas turbine engines may undergo various operational tests to determine response, for example but without limitation, in quality control, troubleshooting, and/or design process. Some operational tests may be performed without installation of the gas turbine engines into their final configuration, for example, without installation for its adapted use to propel an aircraft. Accordingly, gas turbine engines may be tested with a test stand as an assembly.

Figure 1:
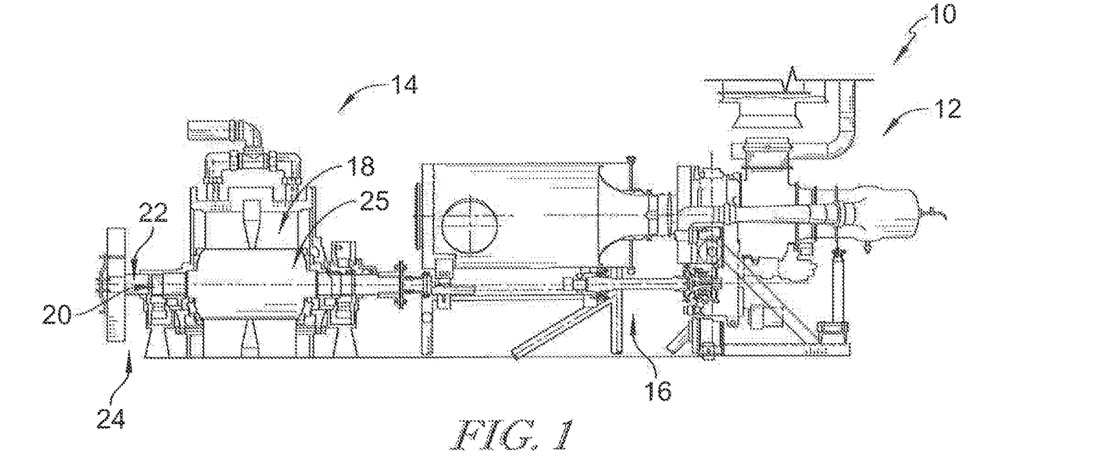
FIG. 1 is an elevation view of a gas turbine engine test assembly including a gas turbine engine (on the right) and a test apparatus (on the left) including a test shaft coupled with an output shaft of the gas turbine engine to receive rotational drive therefrom.

An illustrative gas turbine engine test assembly 10 is shown in FIG. 1 including a gas turbine engine 12 and a test apparatus 14 coupled with the gas turbine engine 12 to perform testing. In the illustrative embodiment, the test apparatus 14 includes a dynamometer (as a test instrument) coupled with an output shaft 16 of the engine 12 to receive rotational force. The dynamometer generates brake torque from the rotational torque of the output shaft 16 for measurement in testing operation of the engine 12

As shown in FIG. 1, the test apparatus 14 illustratively includes a test device 18, embodied as the dynamometer, for conducting operational testing on the engine 12, a bearing assembly 20 supported by the test device 18, and a test shaft 22 axially supported by the bearing assembly 20 for driven rotation by the engine 12. The test shaft 22 is illustratively coupled with the output shaft 16 of the engine 12 to receive rotational force. The test shaft 22 illustratively extends through and engages with the test device 18 to transmit torque thereto. In the illustrative embodiment, the dynamometer develops brake torque from the test shaft 22 by electromagnetic forces, but in some embodiments the test device 18 may develop torque load from any one or more of friction, hydraulic, electromagnetic, and/or other suitable manner. The test shaft 22 illustratively rotates relative to the bearing assembly 20 as driven by the output shaft 16, to apply a torque to the test device 18.

Figure 2:
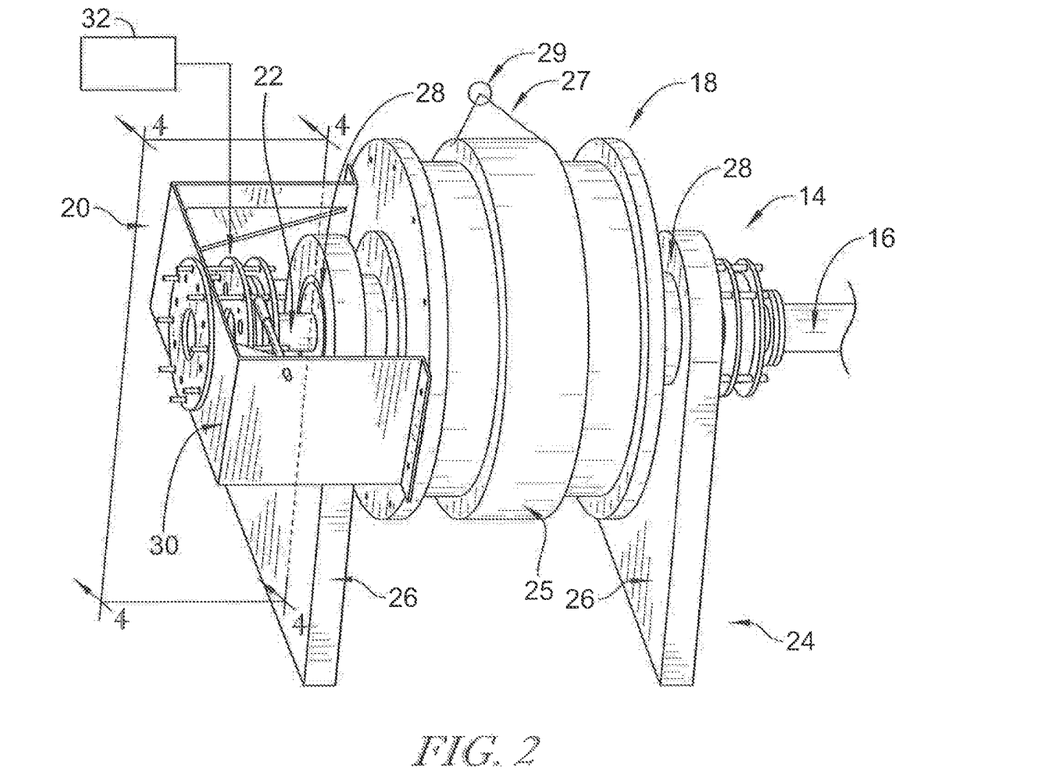
FIG. 2 is a perspective view of the test apparatus of the assembly of FIG. 1 showing that the test apparatus includes a test device embodied as a dynamometer, and showing that the test shaft extends from the right (for coupling with the output shaft of the engine) through the test device and to the left, and showing that the test shaft is axially controlled by a positioner bearing assembly which receives pressurized fluid to bear loads of the test shaft.

As shown in FIG. 2, the test apparatus 14 is shown decoupled from the engine 12. The test device 18 illustratively includes a housing 25 having a torque arm 27 for applying load to a load scale 29 for testing. As the test shaft 22 rotates under drive from the engine 12, a brake torque is generated between the test shaft 22 and the housing 25. The brake torque on the housing 25 is applied to the load scale 29 by the torque arm 27 to determine engine output.

As shown in FIG. 2, the test apparatus 14 illustratively includes a frame 24 that supports the test device 18 above the floor. The frame 24 illustratively includes legs 26 providing trunnion mounts 28 supporting the housing 25 for rotation relative thereto. The test device 18 illustratively includes a bearing mount 30 secured to the housing 25 for supporting the bearing assembly 20.

As shown in FIG. 2, the bearing assembly 20 receives pressurized fluid to support the test shaft 22 for rotation. A source of pressurized fluid 32 is illustratively connected to the bearing assembly 20 to provide pressurized fluid to bear axial loading from the test shaft 22. As explain in additional detail below, pressurized fluid is released from the bearing assembly 20 according to the axial position of the test shaft 22 based on the bearing load generated by the pressurized fluid.

Figure 3:
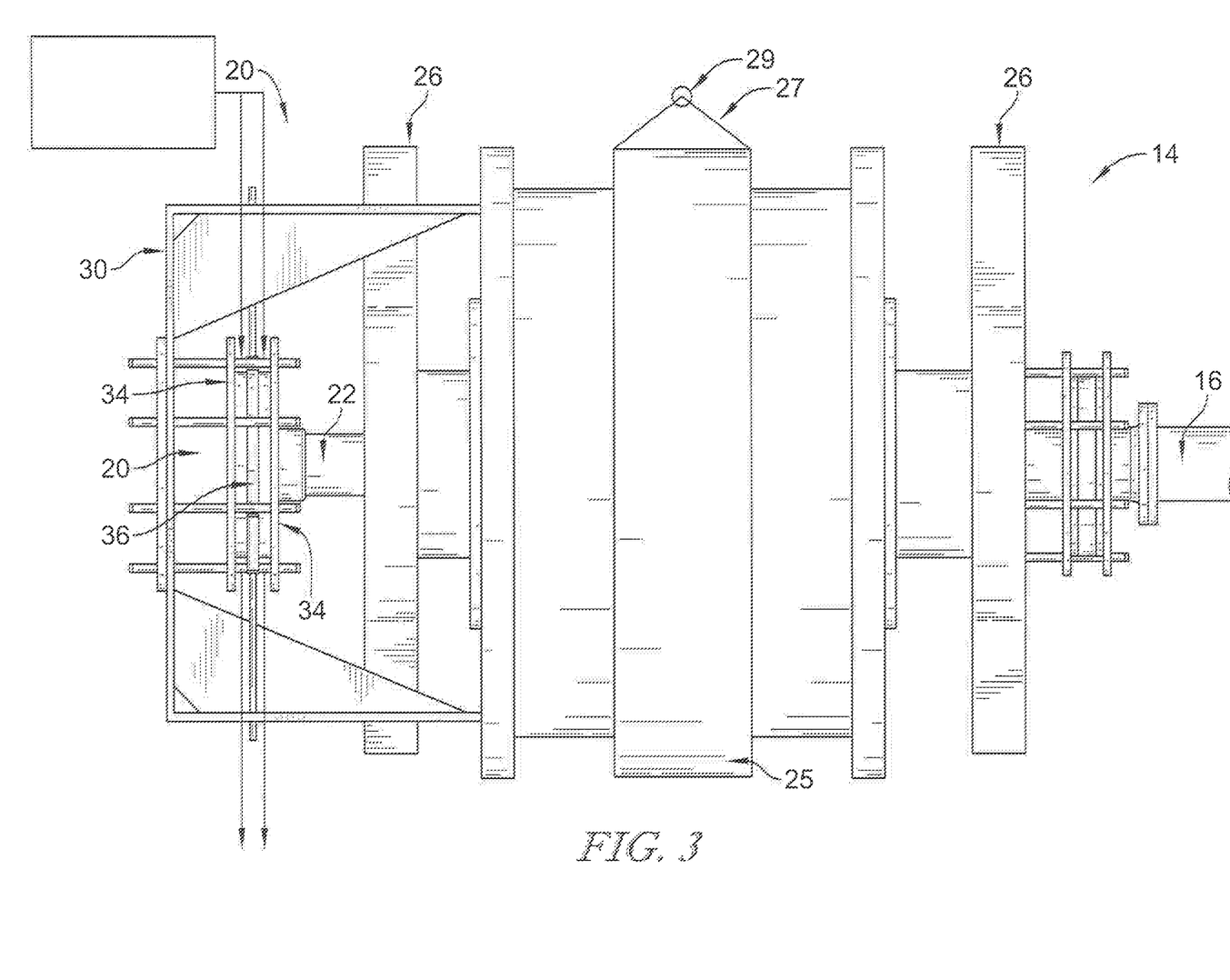
FIG. 3 is an overhead plan view of the test apparatus of FIG. 2 showing that the positioner bearing assembly includes a pair of stators fixed with a housing of the test apparatus, and a rotor positioned between the stators and secured to the test shaft for rotation, and showing that pressurized fluid passes between each stator and the rotor to bear axial load of the test shaft.

As shown in FIG. 3, the bearing assembly 20 illustratively includes a pair of stators 34 fixed to the bearing mount 30 and a rotor 36 having a flange 37 positioned between the stators 34. The rotor 36 is illustratively coupled to the test shaft 22 for rotation relative to the stators 34. As explained in additional detail below, pressurized fluid is illustratively provided between the rotor 36 and each stator 34 to bear loading from the test shaft 22.

Figure 4:
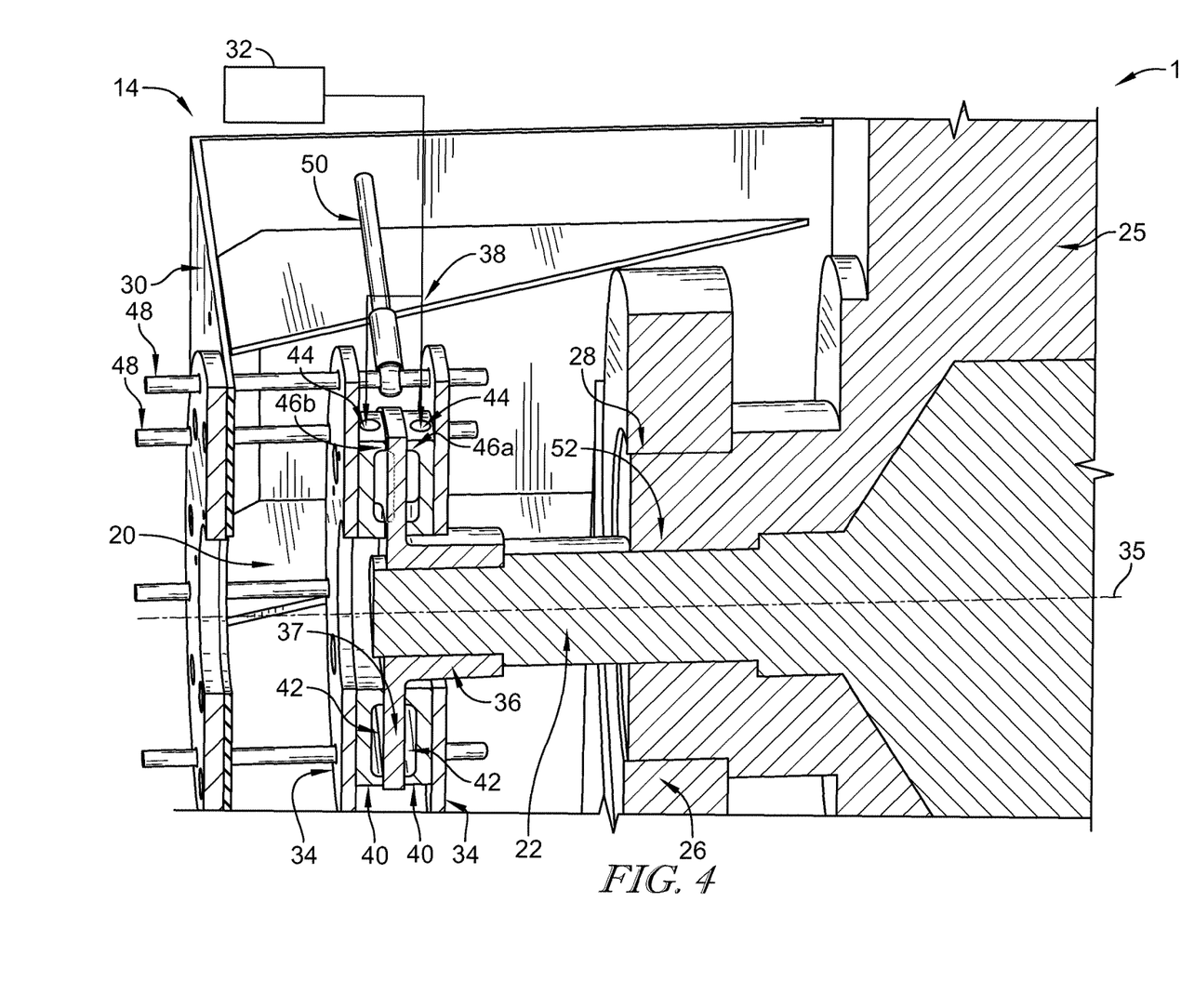
FIG. 4 is a cross-sectional view of a portion of the test apparatus of FIGS. 2 and 3 taken along the plane 4-4 in FIG. 2 showing that each stator includes a fluid circuit including an inlet, an outlet, and a fluid chamber between the inlet and outlet for passing fluid therethrough, and showing that the outlet is formed as a clearance between each rotor and the stator such that movement of the rotor (and thus, the test shaft) governs the rate of fluid expelled through the outlet and thus the pressure within the pressure chambers.

As shown in FIG. 4, the bearing assembly 20 illustratively includes a fluid circuit 38 defined therein. Each stator 34 illustratively includes a seal plate 40 secured thereto and defining a fluid chamber 42 open on one axial end facing the flange 37 of the rotor 36. Each stator 34 includes a fluid inlet 44 connected to receive fluid from the source of pressurized fluid 32 and a fluid outlet 46a, 46b for expelling fluid therefrom. Each of the inlets 44 and outlets 46a, 46b being fluidly connected, respectively upstream and downstream, with the corresponding fluid chamber 42 to form the fluid circuit 38.

As shown in FIG. 4, the outlets 46a, 46b illustratively extend circumferentially about the seal plates 40. Each fluid outlet 46a, 46b is illustratively formed as a gap between the seal plate 40 and the rotor 36. As explained in additional detailed below, each gap is formed as a clearance between the seal plate 40 and the rotor 36. Each outlet 46a, 46b illustratively comprises a cross-sectional area defined by the width of the clearance multiplied by the circumference at the outlet 46a, 46b itself. Thus, the size of the clearance affects rate at which fluid is released from the corresponding fluid chamber 42 and, therefore, the pressure retained within the fluid chamber 42 to bear loading of the test shaft 22.

Figure 5:
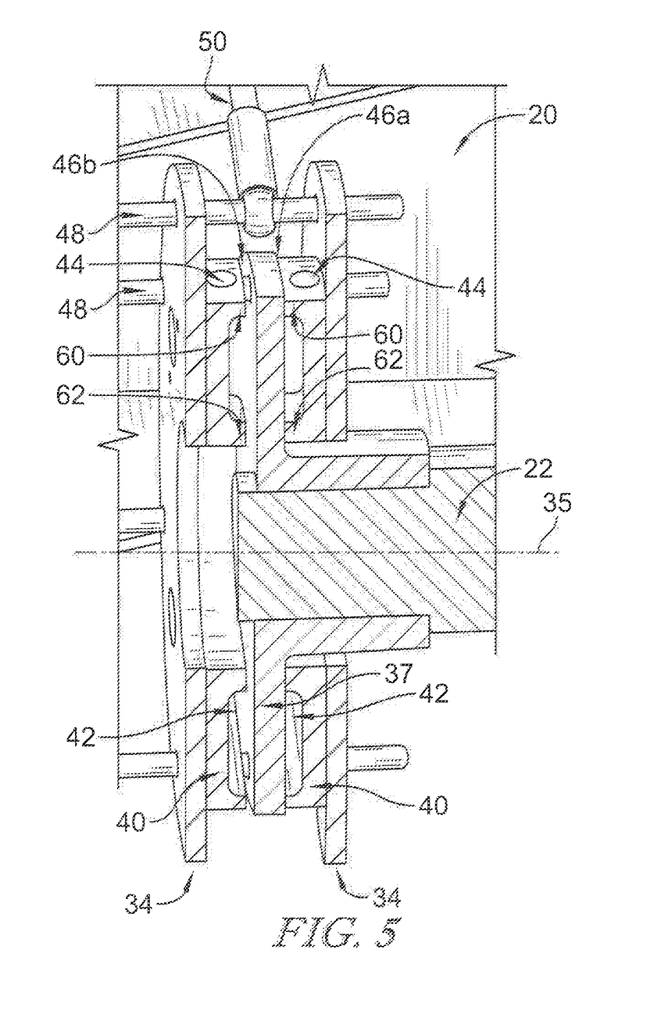
FIG. 5 is the cross-sectional view of FIG. 4 showing the rotor shifted to the right to show one outlet (right hand) in a reduced arrangement to increase pressure within the corresponding fluid chamber, and the other outlet (left hand) in a widened arrangement to relieve pressure within the corresponding fluid chamber to encourage the test shaft back towards a default position (to the left)
Figure 6:
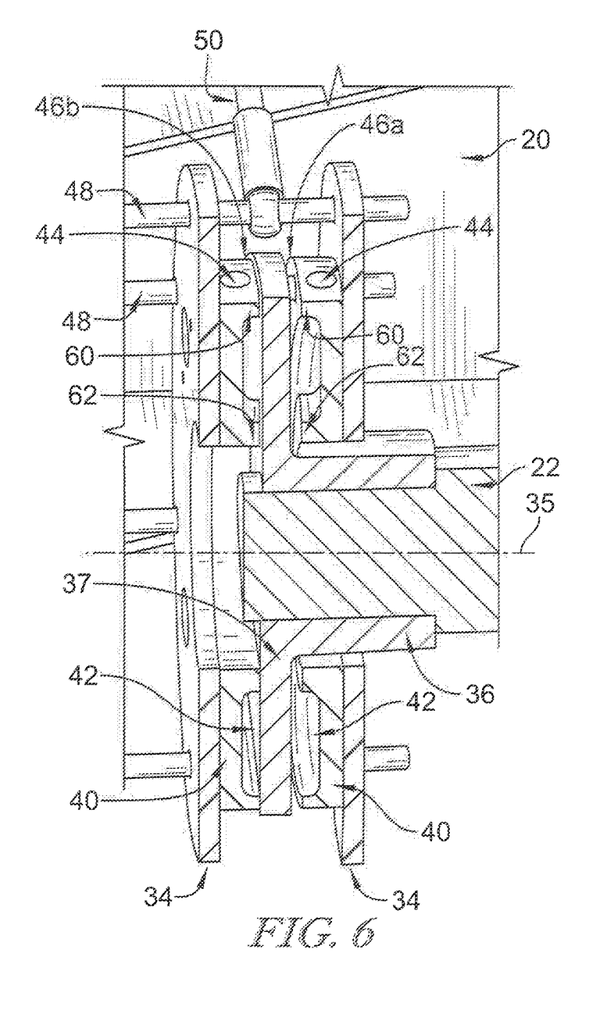

As shown in FIGS. 5 and 6, axial movement of the rotor 36 relative to the stators 34 can adjust the size of the clearances between the seal plates 40 and the rotor 36 and, therefore, the cross-sectional flow area through the outlets 46a, 46b. As shown in FIG. 5, the rotor 36 is shifted to the right relative to the stators 34 (in the orientation shown) configuring the outlet 46a into a reduced arrangement having a narrowed cross-sectional flow area, and configuring the outlet 46b into an enlarged arrangement having a widened cross-sectional area. Comparatively, as shown in FIG. 6, the rotor 36 is shifted to the left relative to the stators 34 (in the orientation shown) configuring the outlet 46b into a reduced arrangement having a narrowed cross-sectional flow area, and configuring the outlet 46a into an enlarged arrangement having a widened cross-sectional area.

As shown in FIGS. 5 and 6, when one of the outlets 46a, 46b is arranged in the reduced arrangement, fluid released through the narrowed clearance is restricted causing an increase in pressure within the corresponding fluid chamber 42. The increased pressure applies an increased axial bearing force to the flange 37 of rotor 36 and thus the test shaft 22 in the direction away from the open axial end of the fluid chamber 42. Moreover, when one of the outlets 46a, 46b is arranged in the reduced arrangement, fluid can escape more easily through the enlarged clearance causing a pressure decrease within the corresponding fluid chamber 42. The decreased pressure reduces an axial bearing force to the flange 37 of the test shaft 22 in the direction away from the open axial end of the fluid chamber 42. The outlets 46a, 46b each illustratively form a valve means for regulating the rate of fluid released from the corresponding fluid chamber 42 to govern pressure therein. Accordingly, the cross-sectional area of each outlet 46a, 46b is inversely proportionate to the pressure within the corresponding fluid chamber 42. In some embodiments, the test apparatus 14 may include control valves such as inlet valves, outlet valves, for example but without limitation, on the fluid connections lines before and/or after the inlets and outlets, and/or combinations thereof, in addition to and/or in place of the outlets 46a, 46b, to govern pressure control within the fluid chambers 42. For descriptive purposes, the enlarged and reduced configurations of the outlets 46a, 46b are embodied relative to a central position of the flange 37 of the rotor 36 between the stators 34 as a generally symmetric assembly, but in some embodiments, the baseline dimensions, pressures, and/or relative positions of the stators 34 relative to the rotor 36 may vary according to design.

Returning to FIG. 4, the bearing assembly 20 is illustratively secured to the bearing mount 30 of the test device 18 by rods 48 which connect with the stators 34. The rods 48 illustratively extend from the bearing mount 30 and penetrate through and connect with each stator 34. In the illustrative embodiment, the rods 48 are threaded near the stators 34 and penetrate through the stators 34 with clearance; and a spacer is placed between the stators 34 while a nut is secured to the threaded rods 48 on the outer side of the stators 34 to clamp the assembly together. A strut 50 illustratively extends from another portion of the bearing mount 30 for connection with one of the rods 48 to provide cross support. In some embodiments, any suitable securing of the assembly may be utilized.

Also referring to FIG. 4, the test shaft 22 is illustratively supported for rotation by a babbit bearing 52 formed within the housing 25. The babbit bearing 52 is illustratively positioned axially coincident within the trunnion mounts 28, but in some embodiments, may have any axial position relative to the trunnion mounts 28 having the same centerline of rotation. In some embodiments, a film of oil can be formed in the babbit bearing 52 as an interface between the test shaft 22 and the housing 25.

Figure 7:
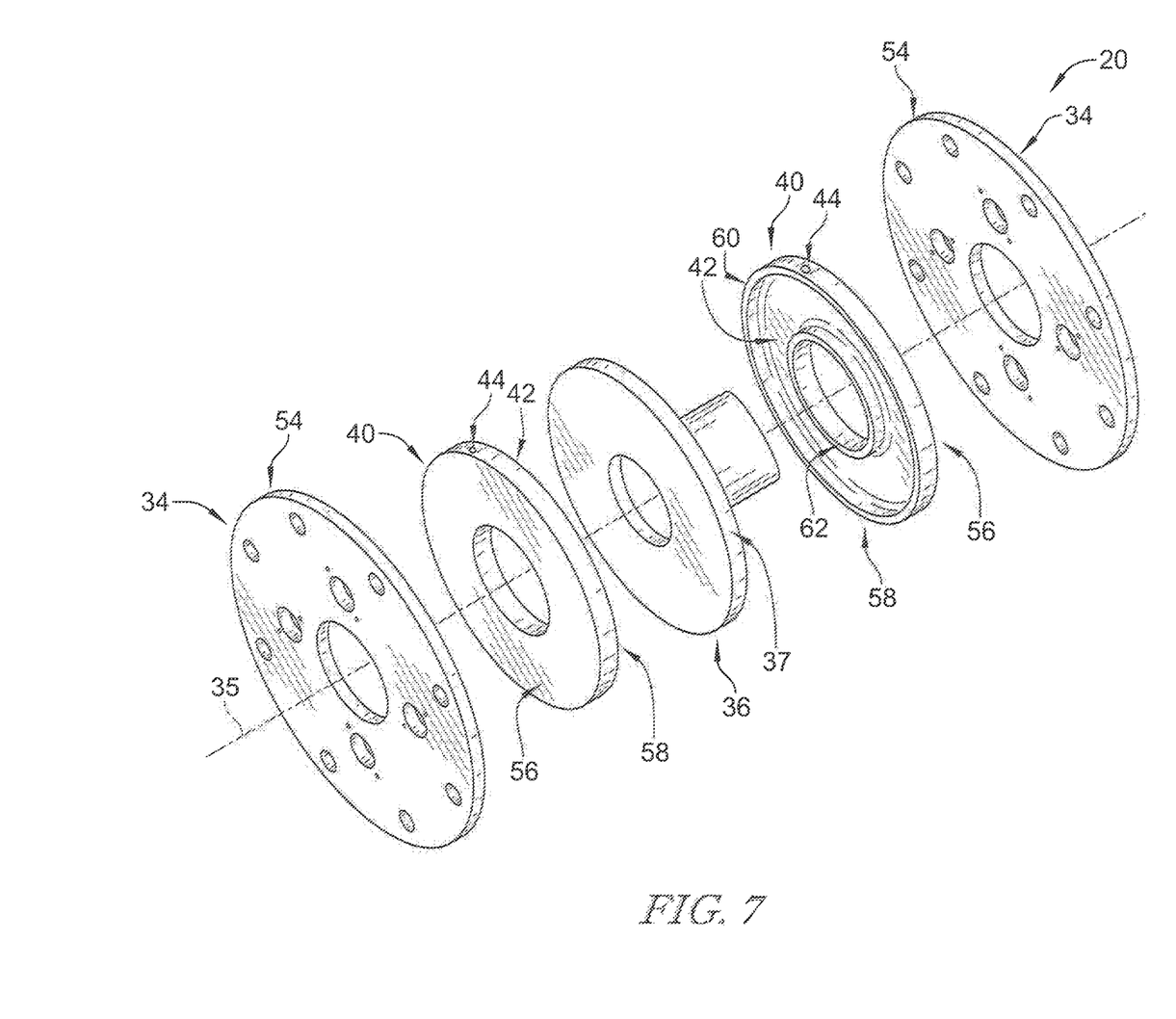
FIG. 7 is an exploded perspective view of the positioner bearing assembly shown in FIGS. 2-6 showing that the stators each include a stator plate and a seal disk fixed to the stator plate, and that the seal disks each define the fluid chambers as a depression formed therein and defined radially by inner and outer lips of the seal disk, and showing that at least one of the outer and inner lips define the outlet of the fluid circuit.

As shown in FIG. 7, the stators 34 each illustratively include a base disk 54 having the respective seal plate 40 secured on an axial side thereof. Each seal plate 40 illustratively includes an axial side 56 facing the respective base disk 54 and an opposite axial side 58 facing the flange 37 of the rotor 36. Each seal plate 40 illustratively includes an outer lip 60 and inner lip 62 each extending axially towards the flange 37.

As shown in FIG. 7, each fluid chamber 42 is illustratively defined radially between the inner and outer lips 60, 62 on the side 58 having the open axial end of the fluid chamber 42 adjacent the flange 37 of the rotor 36. In the illustrative embodiment, the outer lip 60 defines the clearance of the outlet 46a, 46b with the flange 37, but in some embodiments, the inner lip 62 may additionally or alternatively define an outlet 46a, 46b as a clearance between the rotor 36 and the flange 37. In some embodiments, one or the other of the inner and outer lip 60, 62 may include a resilient seal to inhibit passage of fluid between itself and the rotor while the other lip 60, 62 forms the outlet 46a, 46b. The inlet 44 of each stator 34 illustratively penetrates radially through the outer lip 60 to fluidly connect with the fluid chamber 42.

In the illustrative embodiment as shown in FIG. 7, each fluid chamber 42 is defined as depression in the corresponding seal plate 40. Each fluid chamber 42 illustratively includes an open axial end facing the flange 37 and forming a boundary of the fluid chamber 42. In some embodiments, the fluid chamber 42 may be formed, at least partly, as a depression within the flange 37 of the rotor 36. The open axial end of each fluid chamber 42 imposes the pressure within the chamber 42 onto the flange 37 of the rotor 36 and therefore onto the test shaft 22. Thus, the pressure within each fluid chamber can bear loading from the test shaft 22.

Figure 8:
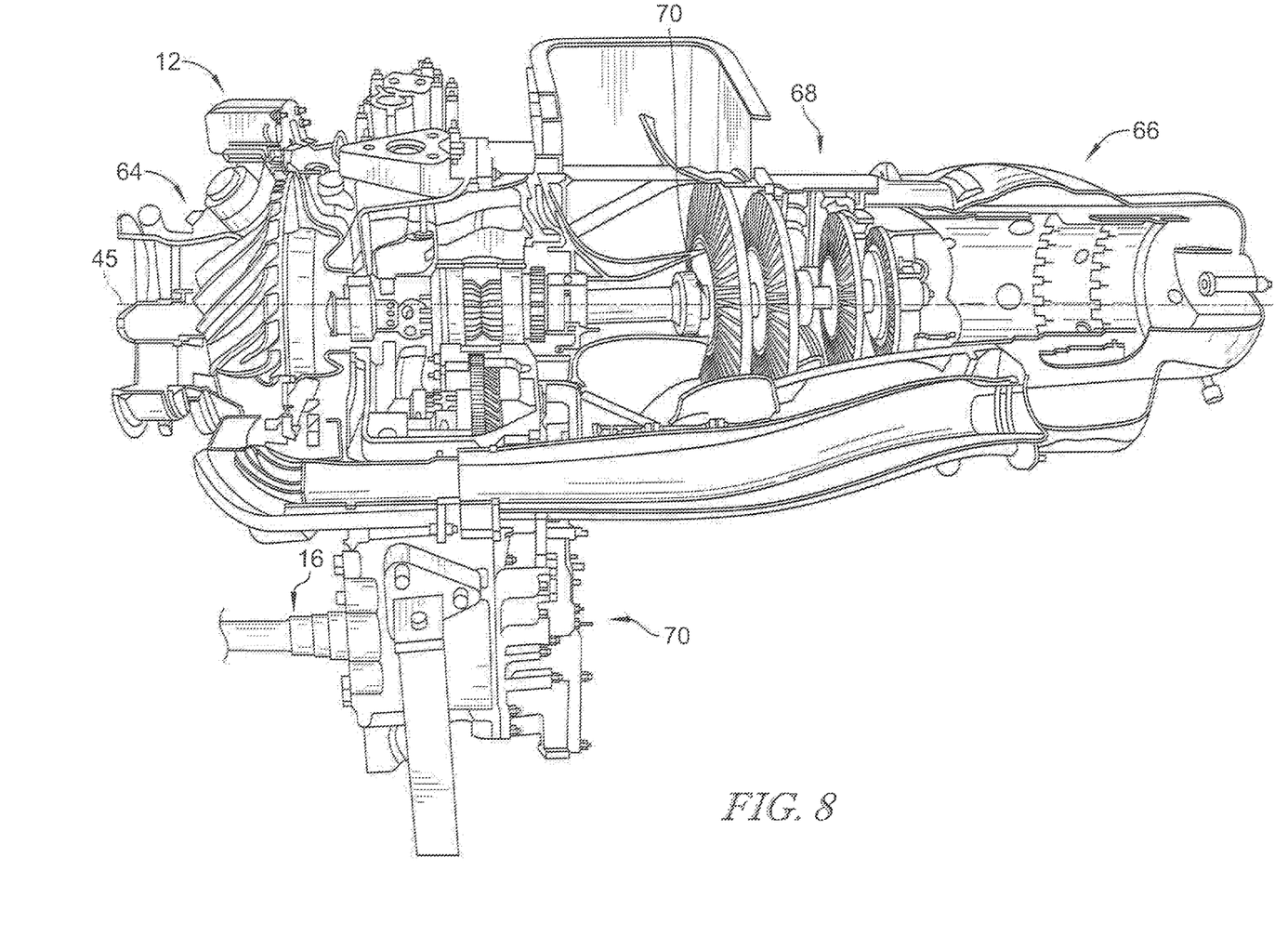
FIG. 8 is a perspective view of the gas turbine engine of FIG. 1 with a portion cutaway to show that the engine includes a compressor section (left) for compressing air, a combustion section (right) for mixing fuel with compressed air and combusting the mixture, and a turbine section for expanded the products of combustion to drive rotation of the output shaft.

As shown in FIG. 8, the gas turbine engine 12 is shown with a portion cut away. The engine 12 illustratively includes a compressor section 64 for compressing air from the atmosphere, a combustion section 66 in communication to receive compressed air from the compressor section 64 for combusting fuel mixed with the compressed air into combustion products, and a turbine section 68 that receives combustion products from the combustion section 66 for expansion to drive a turbine rotor 70 about a rotational axis 45. The turbine rotor 70 is illustratively coupled with the output shaft 16 to drive rotation thereof.

The present disclosure includes non-contact positioners for axial rotational shaft control. In application to test stands, the positioners can allow the stand to be reliable without increasing maintenance. The present disclosure includes test apparatuses illustratively including a disc rotor (attached to the dynamometer rotor) and two annular stators having Delrin seals (seal plates) that form air chambers and can build air pressure if the rotor drifts axially (for example, off-center). As a non-limiting example, the air chambers can each have an internal surface area of about 39 in$^2$ and with about 25 psi of air supply, can produce an axial force of about 1000 lbs to push the rotor back into the correct axial position (e.g., a center position). During operation, the rotor can float with only minor windage, shaft spline lead variations, and shafting misalignment as axially misaligning forces to push the rotor off-center.

The systems, devices, and methods of the present disclosure can be operated with a single shop air supply line split off to each stator with regulators to ensure neither air chamber gets starved of supply air. The present disclosure includes a passive system for operating the positioner bearing assembly without active monitoring by personnel. As the rotor drifts towards one axial side, the sealing surfaces of the Delrin seals (seal plates) approach (and/or may contact) the rotor restricting the air out of the respective chamber and thus increasing air pressure resulting in axial force. The opposing Delrin seal (seal plate) may have large gaps at the sealing surfaces and will not retain higher air pressure. In some embodiments, the widened gap may not retain any additional air pressure.

In this application the dynamometer may float on two trunnion mounts with a load cell radially offset to measure torque. Therefore, a large mount bracket 30 is used to react the axial force applied by the positioner bearing assembly back to the dynamometer housing 25 and not to a fixed position on the test bed.

One advantage of Delrin seals (seal plates) is the installation process. If the Delrin seals (seal plates) are misaligned with the rotor the gap will be non-uniform and contact may occur. The supply air can provide a cooling effect and the Delrin seals (seal plates) can wear to match the rotor to accommodate the misalignment. After the initial contact between the Delrin seals (seal plates) with the rotor, the bearing can functional as a non-contact system. Thus, in some embodiments, the system can be forgiving to initial alignment as it will 'wear in'. Once the break in is completed the seals are non-contact as the air pressure builds up before the Delrin seals (seal plates) make contact with the rotor. For example but without limitation, the sealing surface gaps can be reduced to about 0.003 inches and the air pressure will build and provide sufficient force to re-center the dynamometer rotor. In some embodiments, the seal plates 40 may include any suitable plastic (e.g., Teflon, Delrin), metallic (bronze, brass, aluminum), and/or any other suitable material and/or combinations thereof. In the illustrative embodiments, the seal plate 40 are formed distinctly and attached to the body of the stators 34, but in some embodiments, may be formed integrally, and may include the inner and outer lips as distinct material seals. As shown in FIG. 7, four larger holes may be formed as clearance holes to receive air supply fittings and/or detection devices, such as a pressure transducer. The present disclosure includes discussion of a single rotor interfacing with at least one stator with a fluid interface, but in some embodiments, may include a plurality of rotors interfacing with one or more stators.

The devices, systems, and methods of the present disclosure are robust and repeatable allowing testing to be performed on the gas turbine engine, for example but without limitation, on engine models M250-C47E and M250-C47E/1. The devices, systems, and methods of the present disclosure can be applied to various rotating shafts configurations and can provide a fluid barrier and/or non-contact arrangement for bearing shaft loads.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine test assembly comprising:
a gas turbine engine including a spool assembly for generating rotational force, the spool assembly including a compressor section for compressing air, a combustor section for combusting a mixture of fuel and compressed air, a turbine section for expanding products of combustion from the combustor, and an output drive shaft coupled with the turbine section to transfer rotational force,
a test apparatus coupled with the drive shaft to receive rotational force from the gas turbine engine, the test apparatus including a test device, a test shaft rotationally coupled to the drive shaft for rotation about an axis, and a positioner bearing assembly connected with the test device for supporting the test shaft, the positioner bearing assembly including a rotor coupled with the test shaft, at least two stators fixed with the test device adjacent to the rotor, and at least one fluid seal arranged between the rotor and each of the at least two stators and defining a respective clearance, wherein at least one stator of the at least two stators is arranged on each opposing side of the rotor
wherein the positioner bearing assembly includes a fluid circuit including a respective fluid chamber defined between the rotor and each of the at least two stators to provide a fluid interface between the rotor and each of the at least two stators, each respective fluid chamber having at least one fluid inlet for receiving fluid into the fluid chamber, and at least one fluid outlet for expelling fluid from the fluid chamber, wherein at least one of the rotor and the at least two stators are movable relative to the other between a relief position in which the respective clearance between the rotor and one of the at least two stators has an enlarged arrangement, and a pressure position in which the respective clearance between the rotor and one of the at least two stators has a reduced arrangement to regulate a pressure within the respective fluid chamber.

2. The gas turbine test assembly of claim 1, wherein the at least one fluid outlet of each respective fluid chamber includes the respective clearance and a cross-sectional flow area defined by the respective clearance is inversely proportionate to the pressure within the respective fluid chamber such that when the cross-sectional area is reduced the pressure increases.

3. The gas turbine test assembly of claim 1, wherein each fluid outlet of the at least one fluid outlet of each of the at least two stators includes the respective clearance defined between the rotor and the respective stator, the respective clearance determined by a relative position of the rotor and the respective stator, and each of the clearances has a cross-sectional flow area that is inversely proportionate to the pressure within the respective fluid chamber such that when the cross-section flow area is reduced the corresponding pressure increases.

4. The gas turbine test assembly of claim 1, wherein each of the respective fluid chambers is formed as a depression defined in at least one of the respective fluid seal and the rotor.

5. The gas turbine test assembly of claim 4, wherein each of the respective fluid chambers is formed as a depression defined in the respective fluid seal and the rotor, and further includes a radial flange defining a boundary of each of the respective fluid chambers.

6. The gas turbine test assembly of claim 1, wherein each fluid outlet of the at least one fluid outlet forms a valve means for regulating the rate of fluid therethrough to govern the pressure within each respective fluid chamber.

7. The gas turbine test assembly of claim 1, wherein a cross-sectional flow area of each of the respective clearances is greater in the enlarged arrangement than in the reduced arrangement.

8. A test apparatus for a gas turbine engine, the test apparatus comprising
a test device, a test shaft arranged for coupling to a drive shaft of the gas turbine engine and supported for rotation about an axis to the test device to apply a torque, and a positioner bearing assembly connected with the test device for supporting the test shaft, the positioner bearing assembly including a rotor coupled with the test shaft, first and second stators fixed with the test device adjacent to the rotor, and a fluid seal arranged between the rotor and each stator and defining a respective clearance between the rotor and each stator, wherein the positioner bearing assembly includes a fluid circuit including a respective fluid chamber defined between the rotor and each stator to provide a fluid interface between the rotor and each stator, each respective fluid chamber having at least one fluid inlet for receiving fluid into the fluid chamber and at least one fluid outlet for expelling fluid from the fluid chamber, wherein at least one of the rotor and the stators is movable relative to the other between a relief position defining one of the respective clearances to have an enlarged arrangement and a pressurized position defining the one respective clearance to have a reduced arrangement to regulate a pressure within the one respective fluid chamber.

9. The test apparatus of claim 8, wherein the at least one fluid outlet includes the respective clearance, and the positioner bearing assembly is configured for movement of the at least one of the rotor and the stators relative to the other to reduce a cross-sectional flow area of the respective clearance to increase the pressure within the respective fluid chamber such that the cross-sectional flow area defined by the respective clearance is inversely proportionate to the pressure within the respective fluid chamber.

10. The test apparatus of claim 8, wherein the at least one fluid outlet includes at least one fluid outlet for each of the first and second stators, and each fluid outlet of each of the first and second stators includes the respective clearance defined between the rotor and the respective stator, and a cross-sectional flow area of each respective clearance is defined according to the relative position of the rotor and the respective stator such that the cross-sectional flow area of each respective clearance is inversely proportionate to the pressure within the respective fluid chamber.

11. The test apparatus of claim 8, wherein each respective fluid chamber is formed as a depression defined circumferentially about the axis in at least one of the fluid seal and the rotor.

12. The test apparatus of claim 11, wherein each respective fluid chamber is formed as a depression defined in the fluid seal and the rotor includes a radial flange defining a boundary of the respective fluid chamber.

13. The test apparatus of claim 8, wherein the at least one fluid outlet forms a valve means for regulating the rate of fluid therethrough to govern the pressure within the respective fluid chamber.

14. The test apparatus of claim 8, wherein a cross-sectional flow area of the respective clearance is greater in the enlarged arrangement than in the reduced arrangement.

15. The test apparatus of claim 8, wherein the at least one fluid outlet includes an outer lip extending towards the rotor to define a portion of the respective fluid chamber and to define the respective clearance.

16. A method of operating a test apparatus including a testing device, a test shaft coupled to a drive shaft of a gas turbine engine and supported for rotation about an axis to apply a torque to the testing device, and a positioner bearing assembly for supporting the test shaft, the positioner bearing assembly including a rotor coupled with the test shaft, at least two stators fixed with the testing device adjacent to the rotor, a fluid seal arranged between the rotor and each of the at least two stators and defining a respective clearance between the rotor and each of the stators, and a fluid circuit including a respective fluid chamber defined between the rotor and each of the stators to provide a fluid interface, each fluid chamber having at least one fluid inlet for receiving fluid into the fluid chamber, and at least one fluid outlet for expelling fluid from the fluid chamber, wherein at least one of the rotor and the at least two stators is movable relative to the other between a relief position defining the respective clearance between the rotor and one of the stators to have an enlarged arrangement, and a pressurized position defining the respective clearance between the rotor and the one of the stators to have a reduced arrangement to regulate a pressure within the respective fluid chamber, the method comprising:
  driving the test shaft for rotation,
  providing pressurized fluid to at least one of the respective fluid chambers,
  passing the pressurized fluid through at least one of the respective clearances, and
  adjusting a cross-sectional flow area of the respective clearances to regulate pressurized fluid through the at least one outlet of the fluid chambers.

17. The method of claim 16, wherein adjusting a cross-sectional flow area of the respective clearances to regulate pressurized fluid through the at least one outlet includes adjusting a cross-sectional flow area of the respective clearance based on the pressure within the respective fluid chamber.

* * * * *